(12) United States Patent
Tonius et al.

(10) Patent No.: US 10,781,913 B2
(45) Date of Patent: Sep. 22, 2020

(54) METHOD FOR CONTROLLING A POSITIVE GEARSHIFT UNIT

(71) Applicant: Daimler AG, Stuttgart (DE)

(72) Inventors: Nils Tonius, Stuttgart (DE); Tobias Haerter, Stuttgart (DE)

(73) Assignee: Daimler AG, Stuttgart (DE)

( * ) Notice: Subject to any disclaimer, the term of this patent is extended or adjusted under 35 U.S.C. 154(b) by 543 days.

(21) Appl. No.: 15/571,663

(22) PCT Filed: Mar. 10, 2016

(86) PCT No.: PCT/EP2016/000433
§ 371 (c)(1),
(2) Date: Nov. 3, 2017

(87) PCT Pub. No.: WO2016/177441
PCT Pub. Date: Nov. 10, 2016

(65) Prior Publication Data
US 2018/0149213 A1     May 31, 2018

(30) Foreign Application Priority Data

May 6, 2015   (DE) ........................ 10 2015 005 803

(51) Int. Cl.
*F16H 61/04*     (2006.01)
*F16D 13/22*     (2006.01)
(Continued)

(52) U.S. Cl.
CPC ............. *F16H 61/04* (2013.01); *F16D 13/22* (2013.01); *F16D 13/56* (2013.01); *F16D 48/06* (2013.01);
(Continued)

(58) Field of Classification Search
CPC combination set(s) only.
See application file for complete search history.

(56) References Cited

U.S. PATENT DOCUMENTS 5,997,435 A * 12/1999 Back ................... B60W 10/06
                                                            477/109

FOREIGN PATENT DOCUMENTS

DE          883 679 C      7/1953
DE       196 31 294 A1     2/1997
(Continued)

OTHER PUBLICATIONS

PCT/EP2016/000433, International Search Report dated Jun. 13, 2016 (Three (3) pages).

(Continued)

*Primary Examiner* — Erin D Bishop
(74) *Attorney, Agent, or Firm* — Crowell & Moring LLP

(57) ABSTRACT

A method for controlling a positive gearshift unit includes, in an engagement procedure, a coupling element, which is connected to a first coupling half and which has a beveled coupling toothing, is brought into engagement with a blocking element, which has a blocking toothing and which is connected to a second coupling half, and is brought into engagement with a catch element, which is connected to the second coupling half, which has a beveled catch toothing, and which is able to move circumferentially with respect to the blocking element. In the engagement procedure, a touch-point is set which comes after a crossing of a synchronous rotational speed in a rotational speed difference profile.

10 Claims, 3 Drawing Sheets

(51) Int. Cl.
*F16D 48/06* (2006.01)
*F16D 13/56* (2006.01)
*F16D 11/00* (2006.01)

(52) U.S. Cl.
CPC .................. *F16D 2011/008* (2013.01); *F16D 2500/10462* (2013.01); *F16D 2500/30415* (2013.01); *F16D 2500/30426* (2013.01); *F16D 2500/50245* (2013.01); *F16H 2061/0474* (2013.01)

(56) References Cited

FOREIGN PATENT DOCUMENTS

| | | |
|---|---|---|
| DE | 197 03 488 A1 | 8/1998 |
| DE | 197 17 042 A1 | 10/1998 |
| DE | 10 2009 000 253 A1 | 7/2010 |
| DE | 10 2010 048 344 A1 | 4/2012 |
| DE | 10 2013 213 156 A1 | 1/2015 |
| GB | 486 532 A | 6/1938 |

OTHER PUBLICATIONS

German Search Report issued in German counterpart application No. 10 2015 005 803.7 dated Jan. 18, 2016, with Statement of Relevancy (Nine (9) pages).

* cited by examiner

|  | S4 | S5 | S2 | S1 | S6 | S3 |
|---|---|---|---|---|---|---|
| V1 | ● | ● |  |  |  | ● |
| V2 |  | ● |  | ● |  | ● |
| V3 | ● | ● |  | ● |  |  |
| V4 | ● | ● |  |  | ● |  |
| V5 | ● |  |  | ● | ● |  |
| V6 |  |  |  | ● | ● | ● |
| V7 | ● |  |  |  | ● | ● |
| V8 |  |  | ● |  | ● | ● |
| V9 | ● |  | ● |  | ● |  |
| R1 | ● | ● | ● |  |  |  |

METHOD FOR CONTROLLING A POSITIVE GEARSHIFT UNIT

BACKGROUND AND SUMMARY OF THE INVENTION

The invention relates to a method for controlling a positive gearshift unit, and to a motor vehicle power train having at least one positive gearshift unit.

A method for controlling an asymmetrical positive gearshift unit is already known from DE 883 679.

In the class, DE 197 17 042 C2 also discloses a method for engaging a positive gearshift unit, in which a synchronous rotational speed is set.

The problem addressed by the invention is particularly that of improving an engagement procedure of an asymmetrical positive gearshift unit.

According to the invention, a method for controlling a positive gearshift unit is proposed, wherein, in an engagement procedure, a coupling element which is connected to a first coupling half and which has a beveled coupling toothing is brought into engagement with a blocking element which has a blocking toothing and which is connected to a second coupling half, and is brought into engagement with a catch element which is connected to the second coupling half, which has a beveled coupling toothing, and which is able to move circumferentially with respect to the blocking element, wherein, in the engagement procedure of the positive gearshift unit, a touch-point is set at a point in time along a rotational speed difference profile which is after the crossing of a synchronous rotational speed, wherein the synchronous rotational speed particularly corresponds with zero rotation. As a result, it is possible to ensure, taking into account a kinematics of an underlying transmission gear set, that a relative rotation between the coupling halves occurs in a rotational direction in which the blocking toothing can mesh with the catch toothing and with the blocking toothing. An engagement procedure can be improved in this way. This approach particularly prevents repelling of the coupling halves due to incorrect direction of rotation, thereby preventing associated wear and associated drops in smoothness. In this context, the term "positive gearshift unit" is particularly intended to mean a gear shifting unit which furnishes a switchable positive connection between the two coupling halves. The term 'touch-point' is particularly intended to mean a point in time during the engagement procedure when the coupling toothing first comes into contact with the blocking toothing and/or the catch toothing. The term "crossing of the synchronous rotational speed" is particularly intended to mean a point in time during the engagement procedure when a rotational speed difference between the coupling halves has the value zero. The term "beveled toothing" in this context is particularly intended to mean a toothing with claws or teeth which are beveled in the circumferential direction. As a result of the beveled coupling toothing and the beveled catch toothing, the positive gearshift unit has an asymmetrical design. This results in the positive gearshift unit having an indicated direction of rotation in which the engagement is possible. The term "connected at least in a torque-proof manner" is particularly intended to mean connected in a torque-proof manner or constructed as a single piece. The term "included" is particularly intended to mean specifically programmed, designed and/or equipped.

The synchronous rotational speed advantageously corresponds to zero RPMs. Such a method is particularly advantageous for a positive gearshift unit designed as a brake, wherein one of the coupling halves is connected in a torque-proof manner to a gearbox. The coupling halves are particularly advantageously constructed as a single piece together with the gearbox.

A rotational speed difference profile is preferably actively set for the engagement procedure of the positive gearshift unit. The active setting of rotational speed difference profiles makes it possible to set a rotational speed difference for the touch-point which enables a comfortable and low-wear engagement procedure. In addition, it can be ensured that the rotational speed difference profile has a crossing of the rotational speed difference. The term "active setting" in this context is particularly used to mean that the rotational speed difference follows a target curve which is prespecified by a control—and/or regulating device, by way of example.

It is proposed that the rotational speed difference profile be set by controlling an engine. Controlling the engine makes it possible to set the rotational speed difference profile particularly well. The term "engine" in this case is particularly used to mean an engine used to drive a motor vehicle—such as an internal combustion engine or an electric motor, for example.

A two-digit rotational speed difference—in particular a rotational speed difference of between about 25 and about 75 rpm—is advantageously set for the touch-point. In the context of the invention, a 'two-digit rotational speed difference' should be understood as a rotational speed difference with a value between 1 and 99 rpm. This makes it possible to keep the load on the positive gearshift unit low. In addition, the engagement procedure of the positive gearshift unit can be designed in a particularly advantageous manner. The rotational speed difference in this case can particularly be set by controlling the engine. By way of example, it can also be contemplated, however, that a friction gearshift unit which is included in the force flow parallel to the positive gearshift unit for the purpose of adjusting the rotational speed difference is included to modify the rotational speed difference.

It is also proposed that a flattened rotational speed difference gradient be set for the touch-point. This makes it possible to achieve particularly smooth shifting with concomitant low wear. A "rotational speed difference gradient" is particularly used to mean a rate of change in the rotational speed difference. A "flattened rotational speed difference gradient" particularly means that the rotational speed difference gradient decreases in a period before the touch-point, in particular in a period between the crossing of the synchronous rotational speed and the touch-point.

In addition, it is advantageous if the rotational speed difference gradient is at least essentially zero. As a result, the engagement procedure can be carried out particularly smoothly.

The invention also proposes a motor vehicle drive train having at least one coupling unit, the same having at least one coupling element, with a beveled coupling toothing, which is connected at least in a torque-proof manner to a first coupling half, and at least one blocking element, with a blocking toothing, which is connected at least in a torque-proof manner to a second coupling half, and at least one catch element, with a beveled catch toothing, which is connected to the second coupling half and is able to move in the circumferential direction with respect to the blocking element, and having a control and/or regulating unit which is included for the purpose of controlling a touch-point which occurs after a crossing of a synchronous rotational speed in the rotational speed difference profile in an engagement procedure of the positive gearshift unit. The motor vehicle drive train preferably comprises a transmission for shifting forward gears, which comprises the positive gearshift unit formed as a brake.

Further advantages are found in the following description of the Figures. The Figures illustrate an embodiment of the invention. The Figures, the description of the Figures, and the claims contain numerous features in combination. A person skilled in the art will also expediently consider the features individually and combine them into sensible further combinations.

DETAILED DESCRIPTION OF THE DRAWINGS

Figure 1:
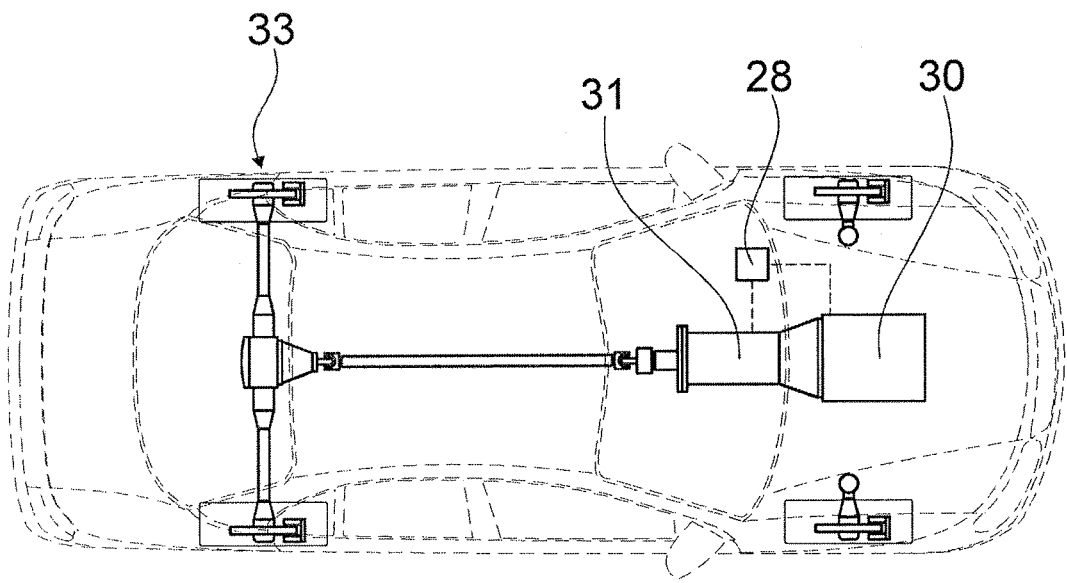
FIG. 1 schematically shows a motor vehicle with a motor vehicle drive train.
Figure 2:
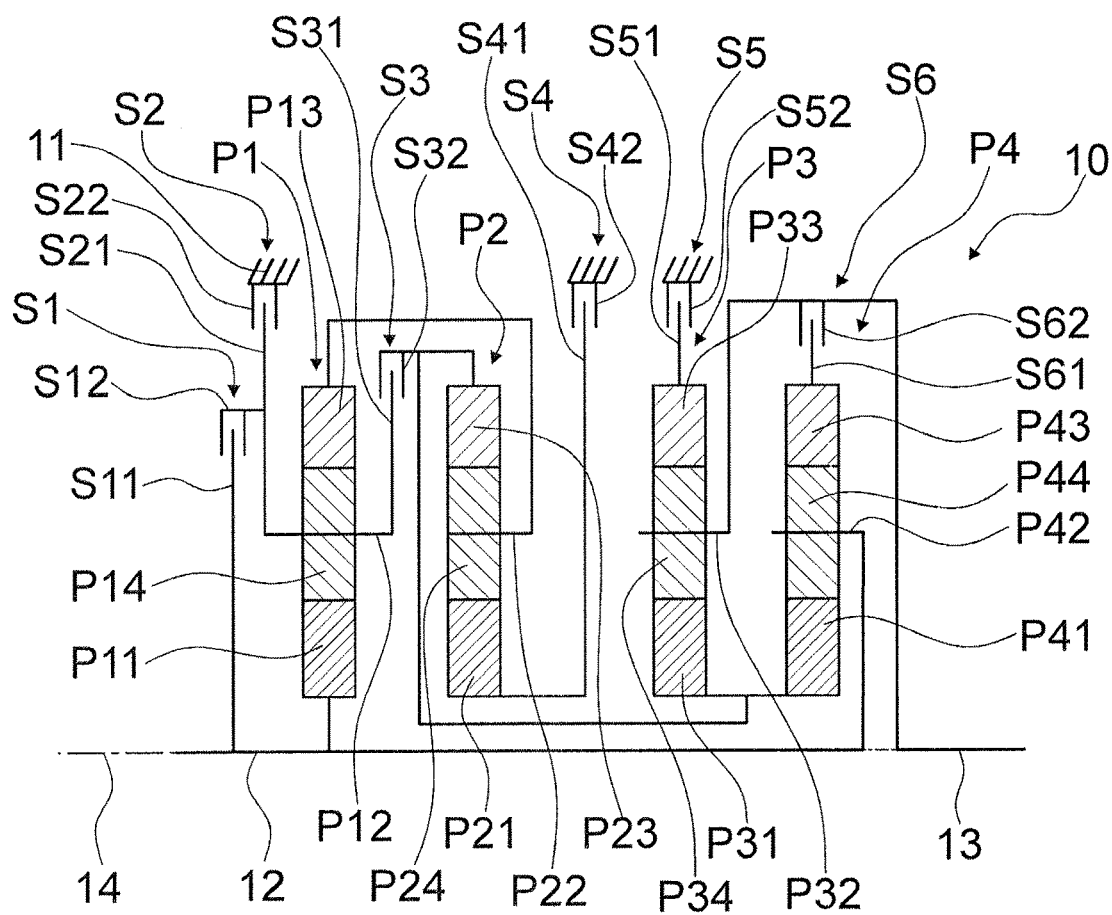
FIG. 2 shows a transmission diagram of a transmission of the motor vehicle drive train.

FIG. 2 schematically shows a motor vehicle drive train having an engine 30, a transmission 31 fastened to the engine 30, and a final drive 33 connected to the transmission 31. The transmission 31 is configured as a multi-stage transmission. The transmission 31 has a transmission gear set 10 included for selecting nine forward gears V1, V2, V3, V4, V5, V6, V7, V8, V9, and a reverse gear R1. The transmission gear set 10 is arranged in a force flow between the internal combustion engine and the driven wheels. The transmission gear set 10 can be connected to a hybrid drive module by means of which a drive torque can be modified. Furthermore, a continuously variable transmission (CVT) can be realized by means of the hybrid drive module and the transmission gear set 10, thereby making it possible for the transmission ratio to be stepless at least in certain ranges.

The transmission device further comprises a gearbox 11 fixed to the body, a transmission input shaft 12 which passes through the gearbox 11, and a transmission output shaft 13 which passes through the gearbox 11. The transmission gear set 10 is arranged inside the gearbox 11. The transmission input shaft 12 is included for the purpose of transmitting drive torque output by the engine 30. The transmission output shaft 13 is included for the purpose of connecting to the final drive 33. The transmission input shaft 12 can be preceded by a module (not shown) which particularly provides a starting functionality—such as a torque converter or a wet starting clutch. The transmission input shaft 12 and the transmission output shaft 13, which are coaxial in the illustrated embodiment, can in principle be arranged in any order with respect to each other.

The transmission gear set 10 has four planetary gear stages P1, P2, P3, P4 which are operatively linked to each other to select the forward gears V1-V9 and the reverse gear R1 (see FIG. 2). The first planetary gear stage P1, the second planetary gear stage P2, the third planetary gear stage P3 and the fourth planetary gear stage P4 are arranged one behind the other along a primary axis of rotation 14. The planetary gear stages P1, P2, P3, P4 share a common axis of rotation and determine a primary axis of rotation 14. All the planetary gear stages P1, P2, P3, P4 of the transmission gear set 10 have a simple planetary gear set. The terms "first", "second", "third" and "fourth" planetary gear stages P1, P2, P3, P4 indicate a preferred axial sequence of the planetary gear stages P1, P2, P3, P4, starting from the internal combustion engine. Accordingly, the first planetary gear stage P1 is arranged at the first axial position relative to the other planetary gear stages P2, P3, P4, the second planetary gear stage P2 is arranged at the second axial position relative to the other planetary gear stages P1, P3, P4, the third planetary gear stage P3 is arranged at the third axial position relative to the other planetary gear stages P1, P2, P4, and the fourth planetary gear stage P4 is arranged at the fourth axial position relative to the other planetary gear stages P1, P2, P3. In principle, an arrangement of the planetary gear stages P1, P2, P3, P4 can deviate from the illustrated arrangement.

The four planetary gear stages P1, P2, P3, P4 are described in more detail below. The four planetary gear stages P1, P2, P3, P4 each have a sun gear, a planetary carrier and a ring gear. In this case, the terms "first to fourth planetary carrier", "first to fourth sun gear" and "first to fourth ring gear" are used to mean a planetary carrier and/or a sun gear or a ring gear which is functionally assigned to the first to fourth planetary gear stage P1, P2, P3, P4—that is, by way of example, that the first planetary carrier is a planetary carrier of the first planetary gear stage P1.

The first planetary gear stage P1 is arranged on the input side. The first planetary gear stage P1 comprises a first sun gear P11, a first ring gear P13, and a first planetary carrier P12. The first planetary carrier P12 guides planetary gears P14 of the first planetary gear stage P1 on a circular path. The planetary gears P14 mesh with the first sun gear P11 and with the first ring gear P13. The planetary gears P14 are rotatably supported on the first planetary carrier P12.

The second planetary gear stage P2 is arranged centrally on the input end. The second planetary gear stage P2 includes a second sun gear P21, a second ring gear P23, and a second planetary carrier P22. The second planetary carrier P22 guides planetary gears P24 of the second planetary gear stage P2 on a circular path. The planetary gears P24 mesh with the second sun gear P21 and with the second ring gear P23. The planetary gears P24 are rotatably supported on the second planetary carrier P22.

The third planetary gear stage P3 is arranged centrally on the output end. The third planetary gear stage P3 comprises a third sun gear P31, a third ring gear P33, and a third planetary carrier P32. The third planetary carrier P32 guides planetary gears P34 of the third planetary gear stage P3 on a circular path. The planetary gears P34 mesh with the third sun gear P31 and with the third ring gear P23. The planetary gears P34 are rotatably supported on the third planetary carrier P32.

The fourth planetary gear stage P4 is arranged on the output end. The fourth planetary gear stage P4 comprises a fourth sun gear P41, a fourth ring gear P43 and a fourth planetary carrier P42. The fourth planetary carrier P42 guides planetary gears P44 of the fourth planetary gear stage P4 on a circular path. The planetary gears P44 mesh with the fourth sun gear P41 and with the fourth ring gear P43. The planetary gears P44 are rotatably supported on the fourth planetary carrier P42.

Figures 3, 4:
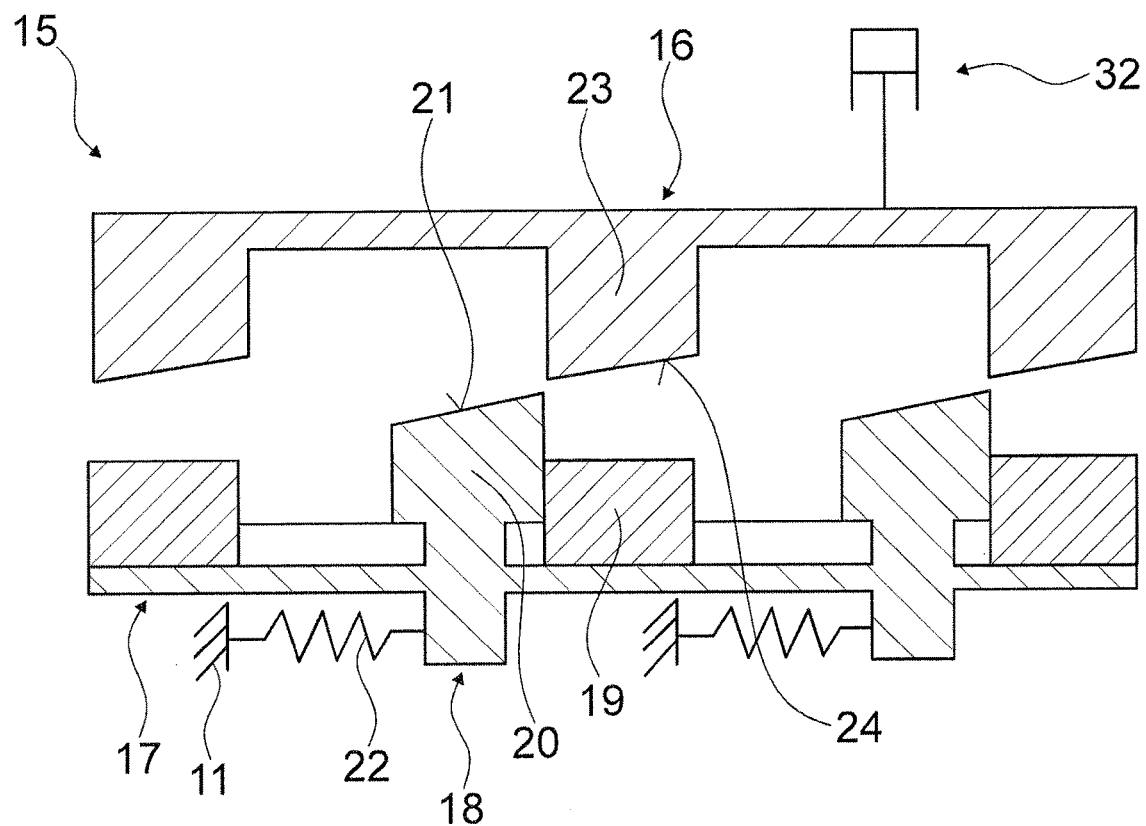
FIG. 3 shows a shift pattern for the transmission.
FIG. 4 shows a positive gearshift unit of a coupling unit of the transmission.
Figure 5:
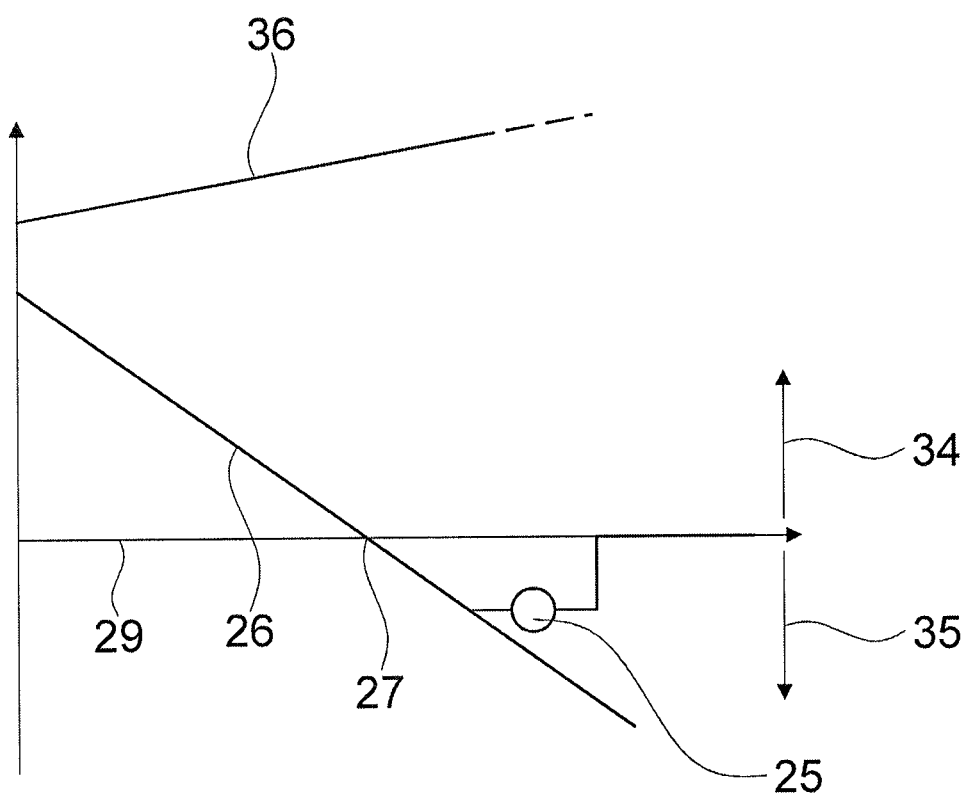
FIG. 5 shows an optimum rotational speed difference profile during an engagement procedure.

To select the forward gear positions V1-V9 and the reverse gear R1, the transmission 31 has three coupling units S1, S3, S6 which are designed as clutches, and three coupling units S2, S4, S5 which are designed as brakes. The three coupling units S1, S3, S6 designed as clutches each have a first rotatably mounted coupling half S11, S31, S61 and a second rotatably mounted coupling half S12, S32, S62. The coupling units S1, S3, S6 are each provided for the purpose of connecting, in a torque-proof manner, their respective two rotatably mounted coupling halves S11, S12, S31, S32, S61, S62. The three coupling units S2, S4, S5 designed as brakes each have one rotatably mounted coupling half S21, S41, S51 and one stationary coupling half S22, S42, S52 fixed to the housing. The coupling units S2, S4, S5 are each included for the purpose of connecting, in a torque-proof manner, their respective rotatable coupling halves S21, S41, S51 and their stationary coupling halves S22, S42, S52. A shift logic for the shifting of the forward gears V1-V9 and the reverse gear R1 is shown in FIG. 3.

The first planetary gear stage P1 and the fourth planetary gear stage P4 form input stages of the transmission 31. The transmission input shaft 12, the first sun gear P11, the fourth planetary carrier P42, and the first coupling half S11 of the first coupling unit S1 are permanently connected to each other in a torque-proof manner. The first ring gear P13 and the second planetary carrier P22 are permanently connected to each other in a torque-proof manner. The second ring gear P23, the third sun gear P31, the four sun gear P41, and the second coupling half S32 of the third coupling unit S3 are permanently connected to each other in a torque-proof manner. The first planetary carrier P12, the second coupling half S12 of the first coupling unit S1, the first coupling half S21 of the second coupling unit S2, and the first coupling half S31 of the third coupling unit S3 are permanently connected to each other in a torque-proof manner. The second sun gear P21 and the first coupling half S41 of the fourth coupling unit S4 are permanently connected to each other in a torque-proof manner. The third ring gear P33 and the first coupling half S51 of the fifth coupling unit S5 are permanently connected to each other in a torque-proof manner. The third planetary gear stage P3 and the fourth planetary gear stage P4 are designed as output stages. The third planetary carrier P32 and the second coupling half S62 of the sixth coupling unit S6 are permanently connected to each other in a torque-proof manner.

The fifth coupling unit S5 has a positive gearshift unit 15 which is included for a positive connection of the two coupling halves S51, S52. The fifth coupling unit S5 can, in principle, comprise a friction gearshift unit arranged parallel to the positive gearshift unit 15, likewise included to connect the two coupling halves S51, S52 to each other. However, it can also be contemplated that the coupling unit S5 only comprises the positive gearshift unit 15.

In the reverse gear R1, and in the forward gears V1, V2, V3, V4, the coupling unit S5 is engaged. In the forward gears V5, V6, V7, V8, V9 the coupling unit S5 is open. When an upshift is performed from the reverse gear R1 or one of the forward gears V1, V2, V3, V4 into one of the forward gears V5, V6, V7, V8, V9, the coupling unit S5 is opened. When a downshift is performed from one of the forward gears V5, V6, V7, V8, V9 into one of the forward gears V1, V2, V3, V4, or into the reverse gear R1, the coupling unit S5 is engaged. The coupling unit S5 has, in the forward gears V5, V6, V7, V8, V9, speed factors which, with respect to an input rotational speed, all have the same sign. If one of the forward gears V5, V6, V7, V8, V9 is selected, a relative rotational movement between the coupling halves S51, S52 of the coupling unit S5 is oriented in a first direction of rotation 34. The positive gearshift unit 15 has an asymmetric design. A meshing of the positive gearshift unit 15 is only possible if the relative movement of the coupling half S51 is oriented in a second direction of rotation 35 which is directed opposite to the first direction of rotation 34 of the relative movement in the forward gears V5, V6, V7, V8.

In the coupling unit S5 designed as a brake, the second coupling half S52 is designed to be a single piece together with the gearbox 11. The first coupling half S51 is rotatably supported. The positive gearshift unit 15 comprises a coupling element 16 connected to the first coupling half S51 at least in a torque-proof manner. In addition, the positive gearshift unit 15 comprises at least one blocking element 17 connected to the second coupling half S52 at least in a torque-proof manner, and at least one catch element 18 connected to the second coupling half S52. The catch element 18 can move relative to the blocking element 17 in the circumferential direction. The retaining element 18 and the blocking element 17 can be rotated relative to each other through a restricted angle.

The blocking element 17 connected to the second coupling half S52 at least in a torque-proof manner is designed to be a single piece together with the gearbox 11. Alternatively, the blocking element 17 can also be fixed to the gearbox 11. The blocking element 17 has a blocking toothing 19 which is included for a positive connection of the two coupling halves S51, S52. The blocking toothing 19 has a plurality of blocking claws which are designed to be a single piece together with the gearbox 11.

The catch element 18 is designed to be separate from the gearbox 11, but connected to the gearbox 11. The catch element 18 has a beveled catch toothing 20 included to establish the positive connection of the two coupling halves S51, S52. The catch element 18 can be formed, for example, in the form of a ring which is rotatably supported relative to the gearbox 11. The catch toothing 20 has a plurality of catch claws which are formed by the ring or connected to the ring in a torque-proof manner. The catch claws have end faces 21 which are beveled in the circumferential direction. In the illustrated embodiment, the blocking claws and the catch claws alternate with each other.

The positive gearshift unit 15 comprises at least one spring element 22 which is arranged between the blocking element 17 and the catch element 18. The at least one spring element 22 is included to furnish spring force directed circumferentially. The spring force is direct opposite to the second direction of rotation 35, along which the positive gearshift unit 15 is made to mesh. The spring elements 22 illustrated in the embodiment are formed as compression springs. Alternatively, other embodiments are also possible.

The coupling element 16 is connected to the first coupling half S51 in a torque-proof manner. The coupling element 16 has a beveled coupling toothing 23. The coupling toothing 23 comprises a plurality of coupling claws. The coupling claws have end faces 24 which are also beveled in the circumferential direction. The end faces 24 of the coupling claws are inclined in opposite directions, as are the end faces 21 of the catch claws. The positive gearshift unit 15 has an asymmetric design due to the beveled end faces 21, 24 of the catch claws and of the coupling claws.

The catch claws project beyond the blocking claws in the axial direction. In an engagement procedure, the coupling claws initially only contact the catch claws. A time point in an engagement procedure at which the coupling claws and the catch claws touch for the first time is referred to in the following as the touch-point 25. If the relative rotational movement is oriented along the second direction of rotation 35—along which the positive gearshift unit 15 is made to mesh—the catch claws are turned out of position with respect to the blocking claws, and the coupling claws can mesh between the blocking claws and the catch claws. If the relative rotational movement is oriented along the first direction of rotation 34, the beveled end faces 21 of the catch claws and the beveled end faces 24 of the coupling claws ensure that the coupling halves S51, S52 reject each other. The coupling toothing 23 is prevented from meshing with the catch toothing 20.

The motor vehicle power train includes a control—and regulating device 28, which is included for controlling the positive gearshift unit 15. The positive gearshift unit 15 comprises an actuator 32 which is included to move the coupling element 16 relative to the blocking element 17 and the catch element 18. In the illustrated embodiment, the blocking element 17 and the catch element 18 are fixed in the axial direction. The coupling element 16 is able to slide in the axial direction. It can also be contemplated that the second coupling half S52, rather than the first coupling half S51, can slide axially. The actuator 32 is included for the purpose of sliding the coupling element 16 in the axial direction. The actuator 32 is preferably hydraulic in design, and comprises an actuating piston which acts on the coupling element 16. Alternatively, another embodiment of the actuator 32 is possible. By way of example, shifting into and out of a gear can be carried out hydraulically. The actuator 32 is connected to the control—and regulating device 28.

The touch-point 25 at which the coupling halves S51, S52 come into contact for the first time during the engagement procedure can be set by controlling the actuators 32. In the engagement procedure, a touch-point 25 is set which comes after a crossing 27 of a synchronous rotational speed 29. The downshifting procedure of the coupling unit S5 is connected in the illustrated shift pattern to a downshifting procedure of one of the forward transmission gears V5, V6, V7, V8 into one of the forward transmission gears V1, V2, V3, V4. At the beginning of the engagement procedure of the coupling unit S5, the relative rotational movement of the two coupling halves S51, S52 is oriented in the first direction of rotation 34. After the crossing 27 of the synchronous rotational speed 29, the relative rotational movement of the two coupling halves S51, S52 is oriented in the second direction of rotation 35.

A rotational speed difference profile 26 for the engagement of the positive gearshift unit 15 is actively set. The rotational speed difference profile 26 is set by the control—and regulating device 28. In the rotational speed difference profile 26 example shown in FIG. 4, a positive rotational speed difference corresponds to a relative rotational movement in the first direction of rotation 34. The rotational speed difference profile 26 set by the control and regulating unit 28 initially has a rotational speed difference greater than zero. In the crossing 27 of the synchronous rotational speed 29, the rotational speed difference is zero. After the crossing 27 of the synchronous rotational speed 29, the rotational speed difference is negative.

The rotational speed difference profile 26 is set by controlling the engine 30. Depending on the shift pattern, the first coupling half S51 of the coupling unit S5 is operatively connected to the transmission input shaft 12 when at least one of the further coupling units S1, S2, S3, S4, S6 is engaged. In a downshift procedure, rotational speed 36 of the engine 30 must be increased, at least if a rotational speed of the transmission output shaft 13 remains substantially constant. In the engagement procedure of the coupling unit S1, S2, S3, S4, S5, S6, the control—and regulating device 28 sets a rotational speed profile for the engine 30, in which the rotational speed difference profile 26 includes the crossing 27 of the synchronous rotational speed 29.

The touch-point 25 is set in the down-shift procedure from one of the forward gears V5, V6, V7, V8 into one of the forward gears V1, V2, V3, V4. Since the coupling unit S5 is designed as a brake, the synchronous rotational speed 29 corresponds to a zero rotational speed of the first coupling half S51—that is, a profile of an absolute rotational speed of the first coupling half S51 has a zero crossing. A rotational movement of the first coupling half S51 has a direction reversal in the down-shift procedure.

The touch-point 25 which is set by the control—and regulating device 28 by controlling the actuators 32 comes immediately after the crossing 27 of the synchronous rotational speed 29. The rotational speed difference which is set for the touch-point 25 is at most 50 rpm. The rotational speed difference is set by controlling the engine 30.

For the touch-point 25, a flattened rotational speed difference gradient is set. The rotational speed difference gradient corresponds to a slope of the rotational speed difference profile 26 shown in FIG. 4. In the crossing 27 of the synchronous rotational speed 29, the rotational speed difference profile 26 has a greater rotational speed difference gradient than the touch-point 25. Between the crossing 27 of the synchronous rotational speed 29 and the touch-point 25, the rotational speed difference gradient decreases continuously. The rotational speed difference profile 26 has a positive curvature between the crossing 27 of the synchronous rotational speed 29 and the touch-point 25.

At the touch-point 25, the rotational speed difference gradient is essentially zero. The rotational speed difference profile 26 has an almost horizontal course. During a meshing procedure subsequent to the touch-point 25, as long as the coupling claws still slide over the catch claws, the rotational speed difference can still have a non-zero value. With the engagement of the coupling claws between the catch claws, the rotational speed difference drops to zero. Once the coupling claws are engaged with the blocking claws, the positive gearshift unit 15 is completely engaged and the meshing procedure is completed.

LIST OF REFERENCE NUMBERS 10 transmission gear set
11 gearbox
12 transmission input shaft
13 transmission output shaft
14 primary axis of rotation
15 positive gearshift unit
16 coupling element
17 blocking element
18 catch element
19 blocking toothing
20 catch toothing
21 end faces
22 spring element
23 coupling toothing
24 end faces
25 touch-point
26 rotational speed difference profile
27 crossing
28 control and/or regulating unit
29 synchronous rotational speed
30 engine
31 transmission
32 actuator
33 final drive
34 direction of rotation
35 direction of rotation
36 rotational speed
P1 planetary gear
P2 planetary gear P3 planetary gear
P4 planetary gear
R1 reverse gear
S1 coupling unit
S2 coupling unit
S3 coupling unit
S4 coupling unit
S5 coupling unit
S6 coupling unit
V1 forward gears
V2 forward gears
V3 forward gears
V4 forward gears
V5 forward gears
V6 forward gears
V7 forward gears
V8 forward gears
V9 forward gears
P11 sun gear
P12 planet
P13 ring gear
P14 planetary gears
P21 sun gear
P22 planet
P23 ring gear
P24 planetary gears
P31 sun gear
P32 planet
P33 ring gear
P34 planetary gears
P41 sun gear
P42 planet
P43 ring gear
P44 planetary gears
S11 coupling half
S12 coupling half
S21 coupling half
S22 coupling half
S31 coupling half
S32 coupling half
S41 coupling half
S42 coupling half
S51 coupling half
S52 coupling half
S61 coupling half
S62 coupling half

The invention claimed is:

1. A method for controlling a positive gearshift unit, comprising the steps of:
in an engagement procedure of the positive gearshift unit, engaging a coupling element, which is connected to a first coupling half and which has a beveled coupling toothing, with a blocking element, which has a blocking toothing and which is connected to a second coupling half, and with a catch element, which is connected to the second coupling half, which has a beveled catch toothing, and which is movable circumferentially with respect to the blocking element;
in the engagement procedure of the positive gearshift unit, setting a touch-point which comes after a crossing through a synchronous rotational speed in a rotational speed difference profile, wherein the synchronous rotational speed corresponds to a zero rotational speed.

2. The method according to claim 1, wherein the rotational speed difference profile is actively set for the engagement procedure of the positive gearshift unit.

3. The method according to claim 1, wherein the rotational speed difference profile is set by controlling an engine.

4. The method according to claim 1, wherein the positive gearshift unit is a brake and wherein the second coupling half is connected in a torque-proof manner to a gearbox.

5. The method according to claim 1, wherein the engagement procedure of the positive gearshift unit is performed in a downshifting procedure.

6. The method according to claim 1, wherein a two-digit rotational speed difference is selected for the touch-point.

7. The method according to claim 6, wherein a rotational speed difference gradient is at least essentially zero.

8. The method according to claim 1, wherein a flattened rotational speed difference gradient is set for the touch-point.

9. A motor vehicle drive train, comprising:
a positive gearshift unit including:
a coupling element, with a beveled coupling toothing, which is connected at least in a torque-proof manner to a first coupling half;
a blocking element, with a blocking toothing, which is connected at least in a torque-proof manner to a second coupling half;
a catch element, with a beveled catch toothing, which is connected to the second coupling half and movable in a circumferential direction with respect to the blocking element; and
a control and/or regulating unit, wherein the control and/or regulating unit controls a touch-point, in an engagement procedure of the positive gearshift unit, which occurs after a crossing of a synchronous rotational speed in a rotational speed difference profile and wherein the synchronous rotational speed corresponds to a zero rotational speed.

10. The motor vehicle drive train according to claim 9, further comprising a transmission for shifting forward gears, wherein the transmission includes the positive gearshift unit which is a brake.

* * * * *